INVENTORS.
JOHN DALE SUTLIFF
CECIL E. CRAIGO
HARRY E. ROLLINS
BY
Knox & Knox

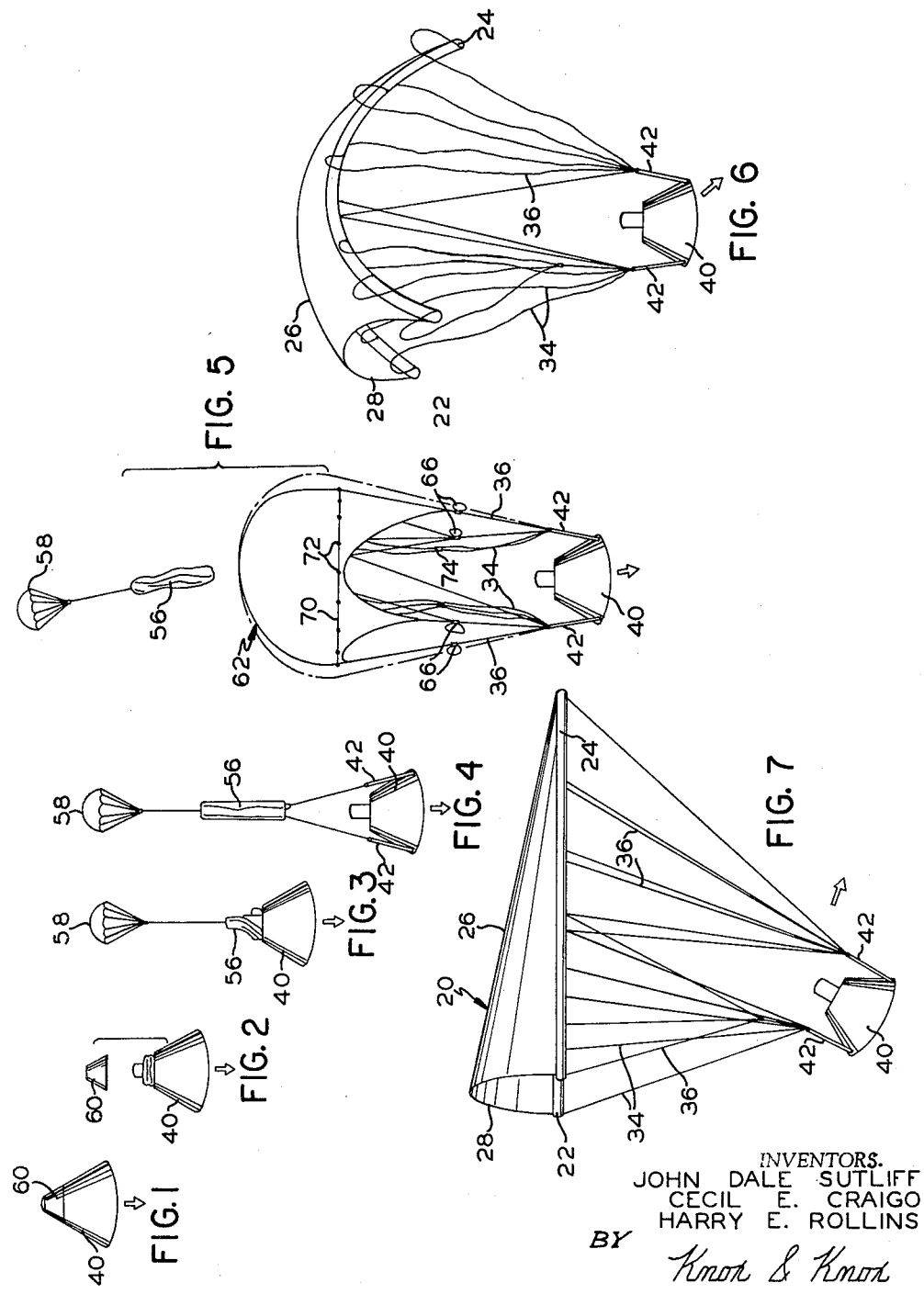

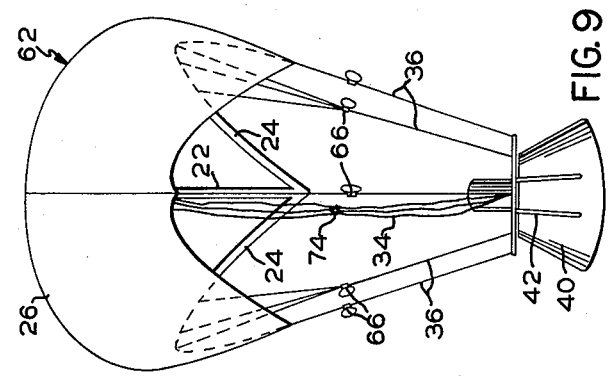
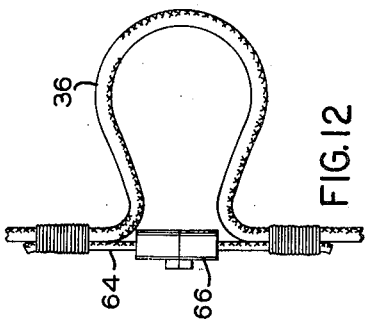
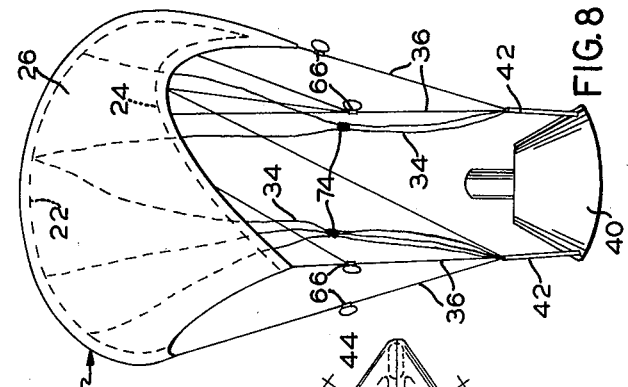
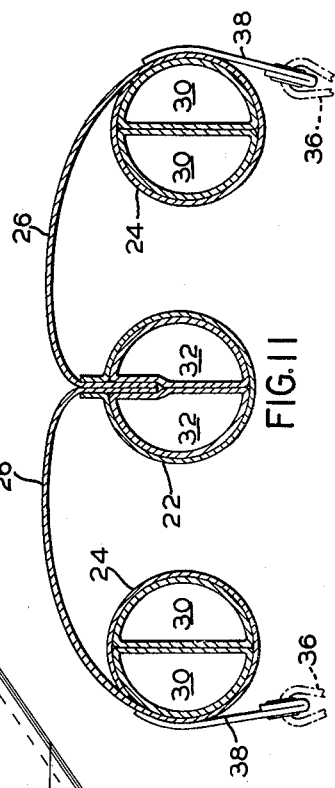
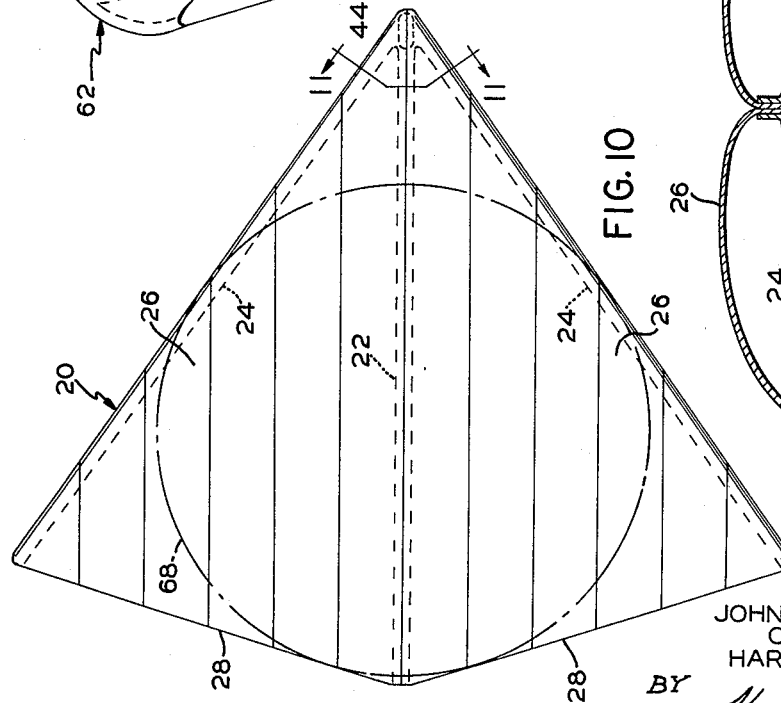

United States Patent Office 3,141,640
Patented July 21, 1964

3,141,640
METHOD OF DEPLOYING FLEXIBLE
WING GLIDER
John D. Sutliff, Cecil E. Craigo, and Harry E. Rollins, San Diego, Calif., assignors to The Ryan Aeronautical Co., San Diego, Calif.
Filed May 28, 1962, Ser. No. 198,081
12 Claims. (Cl. 244—138)

The present invention relates generally to aircraft and more particularly to a method of deploying a flexible wing glider.

In the recovery of certain types of satellite vehicles from space, or the dropping of cargo or personnel from high altitudes, some type of parachute is usually used to control the descent. However, the parachute is somewhat of a compromise, since if sinking speed is low the time of descent is excessive, while if descent time is reduced the impact is severe. Also, directional control of a parachute is difficult and selection of a landing site virtually impossible except under ideal conditions. Recent developments in flexible wing aircraft have shown this type of wing to be stable and practical over a wide range of speeds and load capacities. But the extension of a flexible wing to its full aerodynamic form at an initially high falling speed requires impractical strength of the wing structure, which would make the wing too heavy and bulky to realize its advantages in full.

The primary object of this invention, therefore, is to provide a method for deploying a flexible wing glider first as a parachute to absorb the initial shock loads of deceleration, then disreefing the parachute which extends to form the flexible wing.

Another object of this invention is to provide flexible wing deployment means wherein the initial parachute configuration is maintained by predetermined reefing of the multiple flexible lines by which the wing is attached to the payload.

Another object of this invention is to provide flexible wing deployment means which progresses through the sequential steps substantially automatically without danger of line entanglement or collapse of the wing.

A further object of this invention is to provide flexible wing deployment means which permits packing in a minimum of space for direct attachment to a payload.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURES 1 to 7 illustrate diagrammatically the basic sequential steps in deployment of the flexible wing;

FIGURE 8 is an enlarged view showing an intermediate step between FIGURES 5 and 6;

FIGURE 9 is a rear view of the assembly as taken from the left side of FIGURE 8;

FIGURE 10 is a top plan view of the fully extended wing;

FIGURE 11 is an enlarged sectional view taken on line 11—11 of FIGURE 10;

FIGURE 12 is a fragmentary view of the reefed connection of a typical suspension line;

Wing Construction

Figure 14:
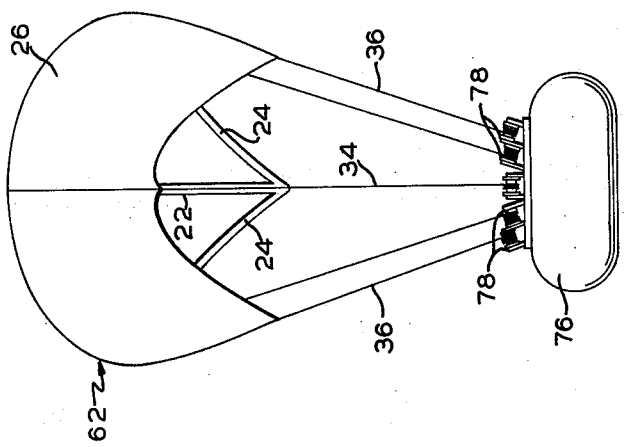
FIGURE 14 is a view similar to FIGURE 9, showing an alternative reefing means.

The flexible wing, generally indicated at 20 and best shown in FIGURES 7 and 10, is basically triangular in planform and has a central longitudinal keel 22 and swept back leading edge members 24 joined to the forward end of said keel. Between the keel 22 and leading edge members 24 is a flexible membrane 26 which comprises the lifting surface and is otherwise unsupported, the trailing edges 28 being freely flexible. Under load and in forward motion the membrane 26 balloons upwardly on either side of keel 22, as in FIGURE 7, and develops considerable aerodynamic lift for its low structural weight. The flexible wing is extremely stable over a wide range of speeds, the membrane adjusting itself automatically to load and speed conditions.

The membrane 26 must be impervious to air, yet strong and fully flexible to withstand folding. It has been found that woven fabric sealed or coated with plastic material is ideal, polyester coated Dacron being one suitable example. The leading edge members 24 are of tubular construction, as in FIGURE 11, and are preferably inflatable to extend from a folded condition to substantially rigid members when the wing is deployed. For safety purposes, the leading edge members 24 may be longitudinally divided into dual chambers 30 individually inflated, so that a puncture in one will not cause collapse of the wing. The keel 22 is similarly tubular and divided into dual chambers 32, the membrane 26 being bonded, stitched, or otherwise secured thereto. The wing is provided with a plurality of suspension lines, including keel lines 34 attached at suitably spaced positions along keel 22 and leading edge lines 36 attached at intervals along leading edge members 24 by means of webs 38. All of the suspension lines are attached to the payload, indicated generally at 40, in any suitable manner, such as by support struts 42. A compressed gas source or gas generator 44 may be enclosed in the forward portion of keel 22, as in FIGURE 10, to inflate said keel and the leading edge members.

Figure 13:
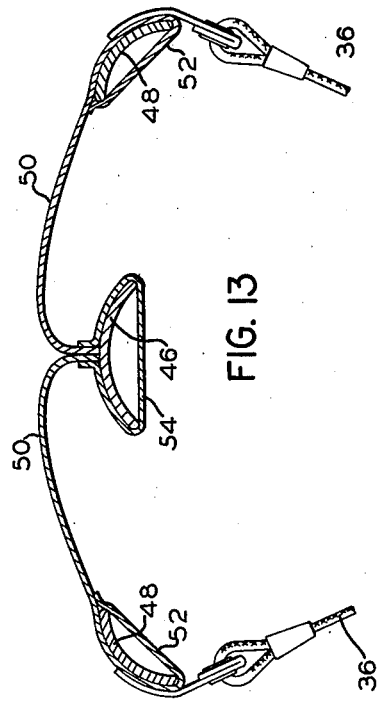
FIGURE 13 is a sectional view similar to FIGURE 10, showing an alternative structure.

For smaller sizes of wings the structure illustrated in FIGURE 13 may be feasible. In this wing, the keel 46 and leading edge members 48 are resilient, either in the material itself or by means of spring connections, to facilitate rolling or packing in a suitable manner. The membrane 50 is wrapped around the leading edge members 48 to form sleeves 52 and a sleeve 54 encloses keel 46 for attachment of the membrane thereto. Other wing structures may also be suitable, the specific materials and constructional details being dependent on the particular use of the wing.

Folding and Storage of the Wing

In its collapsed state, the wing 20 is folded, together with the suspension lines 34 and 36, in the manner of a parachute, the general system of packing being well known. The actual folded form will depend on the nature of the payload and the available space. The folded wing is enclosed in a tubular sleeve 56 of flexible material to which is connected a pilot chute 58 of the usual small size. The entire packed assembly is suitably enclosed, as by a cover 60 on payload 40, to prevent premature release.

Deployment Sequence

The sequence of steps illustrated in FIGURES 1 to 7 apply to various payloads and drop conditions, the particular payload 40 being indicated as a space satellite which is to be landed safely after returning to atmosphere, the wing deployment method being primarily for subsonic speeds. In FIGURE 1 the payload 40 is in free fall and, at a suitable time, the cover 60 is jettisoned, the resultant slipstream extracting and opening the pilot chute 58.

Drag on the pilot chute 58 then pulls out the sleeve 56 enclosing the folded wing, as in FIGURE 3, until the suspension lines are fully extending, as in FIGURE 4. Continued pull by the pilot chute 58 strips the sleeve 56 away, releasing the folded wing, as in FIGURE 5.

In this position, however, the wing is reefed into the form of a parachute, indicated at 62. This is accomplished by shortening certain of the suspension lines 34 and 36 to hold downedge portions of the wings, while allowing the central portion to inflate in the manner of a parachute canopy. A typical method of reefing the suspension lines is illustrated in FIGURE 12, in which a short reefing cord 64 is secured to spaced portions of the suspension line, in this instance a leading edge line 36, pulling the line into a slack loop. Attached to the cord 64 is a disreefing unit 66, which may be a conventional reefing line cutter, or a breakaway coupling held by an explosive bolt, such devices being well known. The particular suspension lines which require to be reefed in this manner will depend on the number of lines and their attachment locations on the wing, the requirement being that the wing is held by the lines into the form of the parachute 62. The effective diameter of the parachute is indicated by the broken line circle 68 superimposed on the wing in FIGURE 10.

In addition to the shortened suspension lines, the parachute 62 is also restrained by a skirt reefing line 70 secured around the skirt or effective lower edge of the parachute as in FIGURE 5. The skirt reefing line 70 may be threaded through rings 72 or other attachments on the wing structure and can be provided with a disreefing unit similar to unit 66. When the parachute 62 opens by air inflation, the considerable initial shock is absorbed by the suspension lines 34 and 36 and the membrane 26, the skirt reefing line 70 greatly reducing outward snatch loads on the attachments of said lines to the wing, in addition to helping maintain the parachute configuration.

After the initial opening shock the skirt reefing line 70 is released, allowing the parachute 62 to extend slightly, as indicated in broken line in FIGURE 5, but still maintaining its parachute form. This position is illustrated more fully in FIGURES 8 and 9, which indicate a typical reefed suspension line arrangement. In addition to the specifically reefed lines, any slack lines not required to hold the parachute shape are loosely reefed in groups by breakaway retainers 74, as on the keel lines 34, to prevent fluttering and tangling. The retainers 74 may be thin cards, frangible sleeves, or the like which fall away when the lines are pulled tight and forced to separate.

When the falling speed of payload 40 has been sufficiently reduced by the parachute 62, all of the disreefing units 66 are actuated, allowing the wing 20 to extend, as in FIGURE 6, until all suspension lines are taut. At the same time, the keel 22 and leading edge members 24 are inflated and become substantially rigid as the wing 20 opens, the final gliding configuration being illustrated in FIGURE 7. Extreme rigidity is not necessary in the keel and leading edge members, since the numerous suspension lines distribute the load and lend support to the shape of the wing 20, which is a very stable aerodynamic surface.

In the present state of the art many different systems have been developed for releasing and disreefing conventional parachutes and are applicable to the flexible wing deployment, the specific apparatus used not being a part of the present disclosure. Similarly, the means for controlling and guiding the wing in the gliding phase will depend on the payload and the degree of maneuverability required for landing the glider. Deployment and control functions may be performed by a program or timing device carried in the payload, by ground based command or, if the payload is a manner capsule, by manual or semiautomatic control.

An alternative method of reefing the suspension lines is illustrated in FIGURE 14, wherein the payload 76 carries a plurality of small drums 78 on which the appropriate lines 34 and 36 are wound. To hold the wing in its parachute form 62 the drums 78 would all be locked by any suitable means and simultaneously released to allow the wing to extend.

Figure 15:
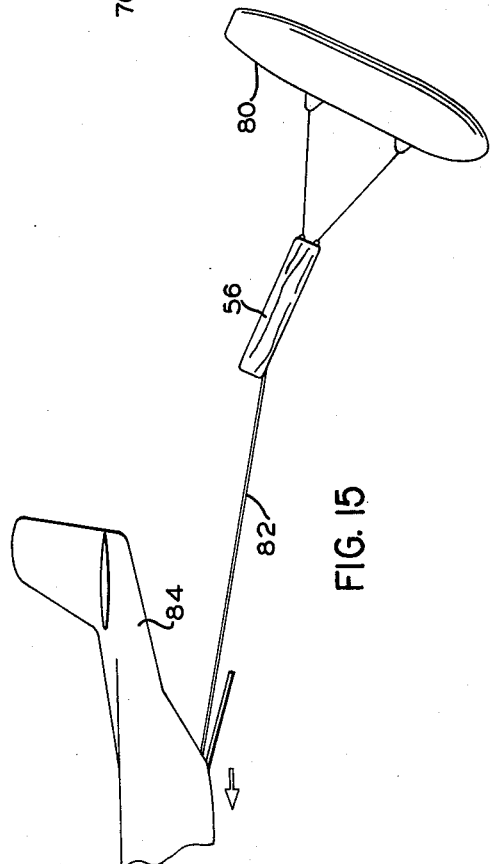
FIGURE 15 is a diagrammatic view of an alternative initial step in deployment.

The system is also applicable for dropping cargo from aircraft, as in FIGURE 15, which illustrates the initial deployment of the wing, still folded in its sleeve 56, from the payload 80. In this instance the sleeve 56 is attached to a static line 82 trailing from the aircraft 84 in a well known manner, instead of using a pilot chute. The sleeve 56 is thus stripped away as the payload and wing, drop behind the aircraft, the remaining steps of FIGURES 5, 6 and 7 being as before.

Regardless of the wing structure, line arrangement and the initial drop phase of the assembly, the deployment of the wing occurs in two major stages. Primary deployment of the main wing is in the form of a parachute accomplished by restraining the wing suspension lines in an appropriate manner to hold the parachute canopy configuration. Then, when the initial deceleration shock is absorbed and falling velocity is sufficiently low, the parachute is disreefed to open automatically into the gliding wing configuration. The sequence of deployment operations can be timed to suit particular applications but can feasibly be completed in less than 10 seconds at low altitude if necessary.

It is understood that minor variation from the form of the invention disclosed herein may be made without departure from the spirit and scope of the invention, and that the specification and drawings are to be considered as merely illustrative rather than limiting.

We claim:

1. A method of deploying a flexible wing glider from which a payload is suspended in free fall by a plurality of extensible linear elements and being initially in a folded condition, comprising:

releasing the folded wing to be opened by air drag and temporarily holding the wing in the general form of a parachute to absorb the initial deceleration loads;

then disreefing the wing and allowing it to open further to its fully extended gliding position.

2. A method of deploying a flexible wing glider from which a payload is suspended in free fall by a plurality of extensible linear elements and being initially in a folded condition, comprising:

releasing the folded wing to be opened by air drag and temporarily withholding certain of said linear elements from full extension and retaining the wing in the general form of a parachute to absorb the initial deceleration loads;

then lengthening said linear elements allowing the wing to open further to its fully extended gliding position.

3. A method of deploying a flexible wing glider attached to a payload in free fall by a plurality of flexible suspension lines and being initially in a folded condition, comprising:

releasing the folded wing to be opened by air drag and temporarily holding the wing reefed into the general form of a parachute to absorb the initial deceleration loads;

then disreefing the wing and allowing it to open further to its fully extended gliding position.

4. A method of deploying a flexible wing glider attached to a payload in free fall by a plurality of flexible suspension lines and being initially in a folded condition, comprising:

releasing the folded wing to be opened by air drag and temporarily withholding certain of the suspension lines to hold the wing in the general form of a parachute to absorb the initial deceleration loads;

then disreefing the reefed suspension lines allowing the wing to open further to its fully extended gliding position.

5. A method of deploying a flexible wing glider attached to a payload in free fall by a plurality of flexible suspension lines and being initially in a folded condition, comprising:

releasing the folded wing to be opened by air drag and temporarily withholding certain of the suspension lines to hold the wing in the general form of a parachute to absorb the initial deceleration loads;

simultaneously holding the parachute-like form with a substantially circular skirt reefing line around the major diameter thereof;

releasing the skirt reefing line and allowing the wing to extend slightly but maintaining the parachute-like form;

then disreefing the reefed suspension lines allowing the wing to open further to its fully extended gliding position.

6. A method of deploying a flexible wing glider attached to a payload in free fall by a plurality of flexible suspension lines and being initially in a folded condition, comprising:

releasing the folded wing to be opened by air drag and temporarily withholding certain of the suspension lines to hold the wing in the general form of a parachute to absorb the initial deceleration loads;

then disreefing the reefed suspension lines allowing the wing to open further to its fully extended gliding position, while simultaneously inflating portions of the wing to provide substantially rigid supporting members.

7. A method of deploying a flexible wing glider attached to a payload in free fall by a plurality of flexible suspension lines, with the wing initially folded and enclosed in a sleeve, comprising:

extracting the sleeve containing the folded wing until the suspension lines are extended;

removing the sleeve and releasing the folded wing to be opened by air drag and temporarily reefing and shortening certain of the suspension lines to hold the wing in the general form of a parachute to absorb the initial deceleration loads;

then disreefining the reefed suspension lines allowing the wing to open further to its fully extended gliding position.

8. A method of deploying a flexible wing glider attached to a payload in free fall by a plurality of flexible suspension lines, with the wing initially folded and enclosed in a sleeve, comprising:

extracting the sleeve containing the folded wing until the suspension lines are extended;

removing the sleeve and releasing the folded wing to be opened by air drag and temporarily reefing and shortening certain of the suspension lines to hold the wing in the general form of a parachute to absorb the initial deceleration loads;

simultaneously holding the parachute-like form with a substantially circular skirt reefing line around the major diameter thereof;

releasing the skirt reefing line and allowing the wing to extend slightly but maintaining the parachute-like form;

then disreefing the reefed suspension lines allowing the wing to open further to its fully extended gliding position, while simultaneously inflating portions of the wing to provide substantially rigid supporting members.

9. A flexible wing glider and deployment means therefor, comprising:

a completely foldable wing of flexible material;

a plurality of suspension lines attached to said wing for connection to a payload;

certain of said suspension lines having reefed, shortened portions to hold the wing, when extended, in a parachute-like form;

means to disreef said reefed suspension line portions to allow full extension of the wing;

and means to make portions of said wing substantially rigid in fully extended position.

10. A flexible wing glider and deployment means therefor, comprising:

a completely foldable wing of flexible material;

a plurality of suspension lines attached to said wing for connection to a payload;

certain of said suspension lines having reefed, shortened portions to hold the wing, when extended, in a parachute-like form;

a substantially circular skirt reefing line releasably attached to said wing to restrain the lower skirt of the wing in the parachute-like form;

means to disreef said reefed suspension line portions to allow full extension of the wing;

and means to make portions of said wing substantially rigid in fully extended position.

11. A flexible wing glider and deployment means therefor, comprising:

a completely foldable wing of flexible material;

a plurality of suspension lines attached to said wing for connection to a payload;

certain of said suspension lines having reefed, shortened portions to hold the wing, when extended, in a parachute-like form;

a substantially circular skirt reefing line releasably attached to said wing to restrain the lower skirt of the wing in the parachute-like form;

means to disreef said reefed suspension line portions to allow full extension of the wing;

said wing having inflatable portions;

and means to inflate said inflatable portions for rigidity when said wing is fully extended.

12. A flexible wing glider and deployment means therefor, comprising:

a completely foldable, flexible wing of substantially triangular plan form, having an inflatable central longitudinal keel member and inflatable swept back leading edge members;

a plurailty of suspension lines attached to said keel member and said leading edge members for connection to a payload;

certain of said suspension lines having reefed, shortened portions to hold the wing, when extended, into a parachute-like form;

a substantially circular skirt reefing line releasably attached to said wing to restrain the lower skirt of the wing in the parachute-like form;

means to disreef said reefed suspension line portions to allow full extension of the wing;

and means to simultaneously inflate and make rigid said keel and said leading edge members.

References Cited in the file of this patent
UNITED STATES PATENTS
3,079,113   Meyer _____ Feb. 26, 1963
FOREIGN PATENTS
1,165,811   France _____ June 9, 1958
OTHER REFERENCES
Aviation Week, pages 57, 59, 63, Sept. 19, 1960.